Nov. 4, 1924.

R. E. STEWART

VARIABLE SPEED INDUCTION MOTOR

Filed Nov. 9, 1921  2 Sheets-Sheet 1

INVENTOR
RALPH E. STEWART
BY
*Hazard & Miller*
ATTORNEYS

Nov. 4, 1924.

R. E. STEWART 1,514,474

VARIABLE SPEED INDUCTION MOTOR

Filed Nov. 9, 1921      2 Sheets-Sheet 2

INVENTOR
RALPH E. STEWART
BY *Hazard & Miller*
ATTORNEYS

Patented Nov. 4, 1924.

1,514,474

UNITED STATES PATENT OFFICE.

RALPH E. STEWART, OF LOS ANGELES, CALIFORNIA.

VARIABLE-SPEED INDUCTION MOTOR.

Application filed November 9, 1921. Serial No. 513,980.

*To all whom it may concern:*

Be it known that I, RALPH E. STEWART, a citizen of the United States, residing at Los Angeles, in the county of Los Angeles and State of California, have invented new and useful Improvements in Variable-Speed Induction Motors, of which the following is a specification.

This invention relates to certain improvements in electric induction motors of the type embodied in my co-pending application, filed Oct. 14th, 1920, Serial No. 416,812, and has for its principal object to provide a variable speed reversible induction motor with powerful dynamic brake action when reducing speed, and in which any speed between the maximum and zero is a true synchronous speed, which action is governed by the degree of angularity between the segments of the stator and the rotor bars.

A further object is to provide a simple mechanical means of controlling the angular positions of the segments of the stator relative to the rotor bars, thereby controlling the stopping, starting and speed rotation of the rotor.

With the foregoing and other objects in view, my invention consists in certain novel features of construction and arrangement of parts that will be hereinafter more fully described and claimed and illustrated in the accompanying drawings, in which:

Figure 1:
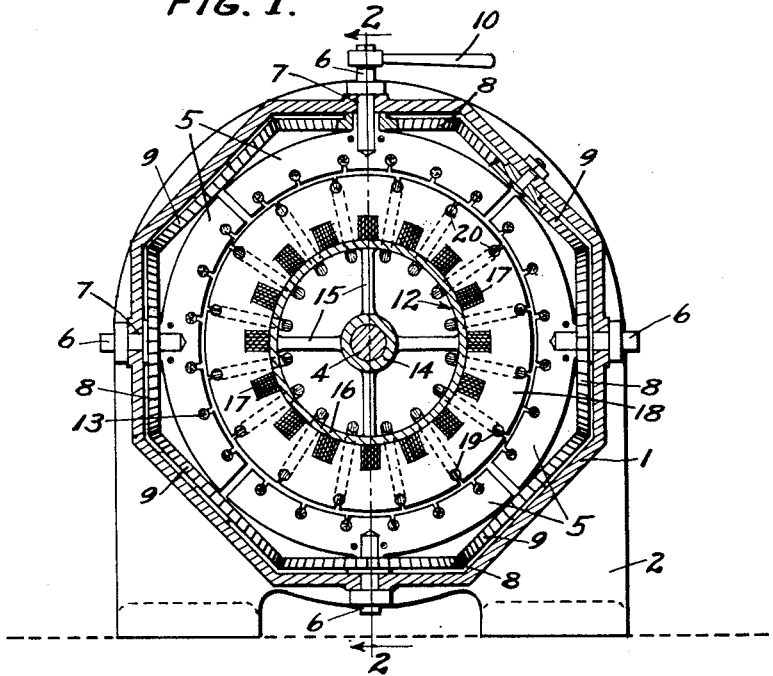
Fig. 1 is a vertical transverse section taken on the line 1—1 of Fig 2.
Figure 2:
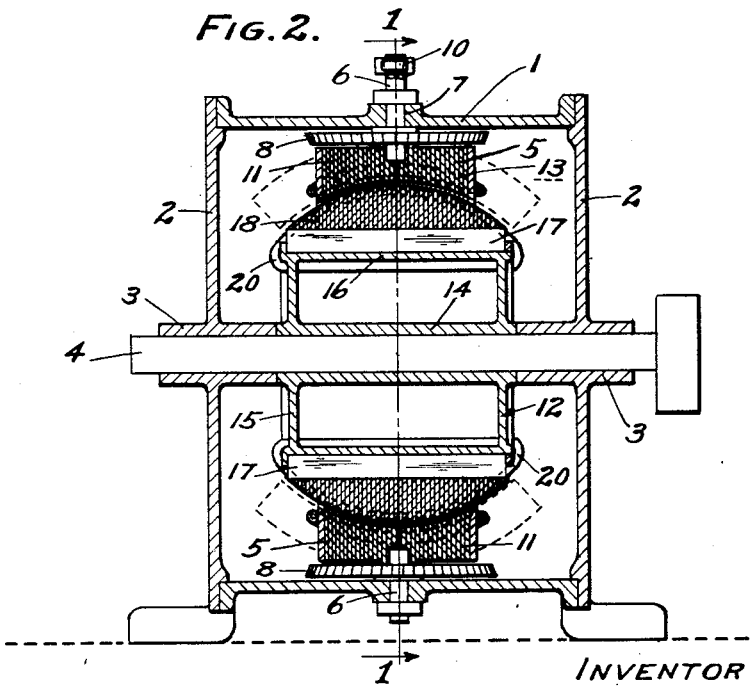
Fig. 2 is a central longitudinal section taken on the line 2—2 of Fig. 1.

Referring by numerals to the accompanying drawings which illustrate a practical embodiment of my invention, 1 designates a frame having a pair of end plates 2 with the usual central bearings 3 for rotatively supporting the rotor shaft 4, and any suitable means could be employed for holding the end plates to the frame 1.

The stator which is mounted on the frame is composed of segments 5, each of which has a stub shaft 6 projecting outwardly therefrom, and journalled in the frame, as at 7, a mitre gear 8 may be fixed to the shaft so as to mesh with an intermediate gear 9 which in turn meshes with the gear 7 of the adjacent segments, and it will thus be seen that with the several segments which are shown as four in number will be rotated about their shafts 6 by the turning of the crank 10. It will of course be understood that any other suitable means could be employed for turning these segments.

The segments 5 are composed of the usual laminated plates 11, the whole segment being of sufficient length so that when the same is rotated to a longitudinal position parallel to the shaft 4, it will cover the longitudinal spherical portion of the spherical rotor 12, and these segments are of the same spherical configuration as the rotor, so that the air cap between the stator and rotor will be maintained at a constant value throughout the rotation of said stator segments.

Figure 4:
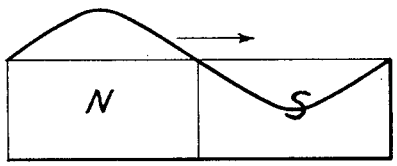
Fig. 4 is a diagrammatic view indicating the travel of the magnetic field in stator segments, also three instantaneous magnetic conditions 120 deg. apart.
Figure 4:
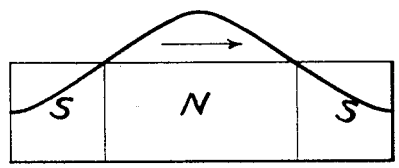
Figure 4:
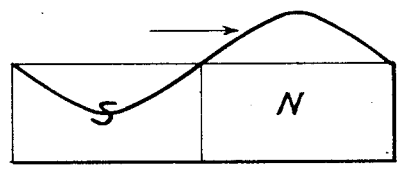

The segments have the usual longitudinal slots 13 to receive wires, said slots being made in the inner side, and are circumferentially spaced so as to produce a shifting sinusoidal magnetic field in the plane of the segments, as illustrated in Fig. 4.

The armature or rotor of my improved motor is of spherical configuration, and comprises substantially, a hub 14 rigidly fixed on the shaft 4, and is provided with radially extending arms 15.

A cylinder 16 is supported by the spokes, and a plurality of groups of longitudinally disposed bars or plates 17 are mounted upon said cylinder, said plates being laminated and forming a part of the inner portion of the rotor.

Disposed about the portion of the bars 17, is a series of plates 18 axially spaced along the cylinder 16 and bars 17, and said plates are also laminated.

The usual longitudinal slots 19 formed in the periphery of the laminated disks 18 have insulated rotor bars 20 mounted therein, the ends of the wires passing around the cylindrical support through one of the other slots, and returning to the point of origin so as to form individual rings.

Figure 3:
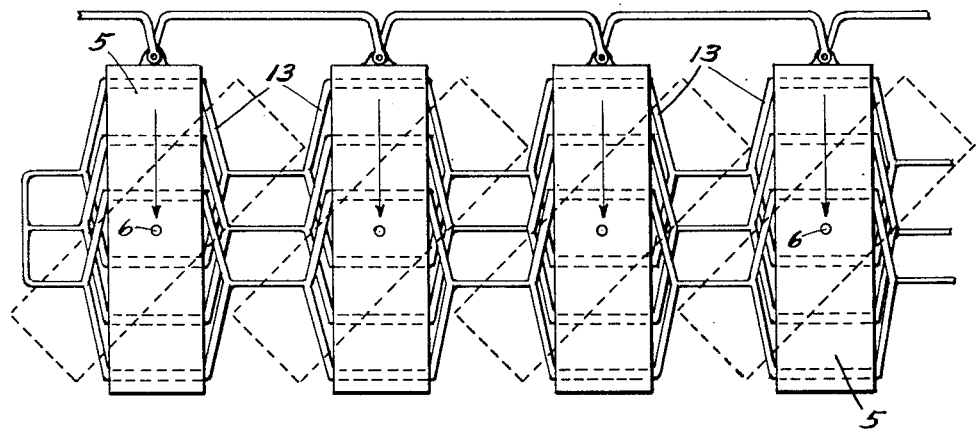
Fig. 3 is a diagrammatic view of the stator showing the arrangement of the coil thereof, the direction of travel of the magnetic fields, and means for moving the segments of the stator simultaneously.

The segments being shown four in number are spaced 90 deg. apart, and obviously by turning the crank 10 the segments will be moved to various similar angular positions simultaneously with respect to the rotor bars 19, as illustrated in Fig. 3.

Thus by rotating the segments 5, the angularity between the shifting magnetic field produced in the segments and the rotor bars may be varied from zero degrees to 90 deg. in either clockwise or anti-clockwise direction, and as a result the motor has zero speed at zero degree position for the reason no magnetic flux links with any of the rotor bars. Under such conditions the rotor bars, the stator segments, and the magnetic fields occupy concentric parallel planes.

When the stator segments are shifted into angular positions with respect to the rotor bars in either direction from zero degree position, the flux links with the rotor conductors, setting them into motion according to well known induction motor laws, but the speed of the motor is governed by the frequency of the circuit, the coil grouping on the stator segments, and the sine of the angularity.

The direction of rotation depends on which direction the stator segments are turned with respect to the rotor bars, from zero speed position.

The motor has a powerful dynamic brake action when reducing speed because if the motor is driven faster than the speed corresponding to the angular position, it becomes an induction generator.

Thus when the speed is reduced the energy stored in the moving system of the motor in the form of motion is returned to the line in the form of electrical energy.

The motor is provided with laminations disposed parallel with motor shaft in order to provide a path for the magnetic flux travelling parallel with the shaft 4, and the laminations are also disposed radially with respect to the shaft 4, and consequently they are vertical to the path of the flux, such arrangement being advantageous, for if the flux passes at right angles through the laminations, there is induced in them powerful eddy currents which condition is greatly modified by the parallel arrangement. The former laminations serve mostly when the motor is in zero speed, or low speed position, because in these positions the magnetic flux travel more or less parallel with the shaft 4.

The motor of my improved construction is comparatively simple, and is adaptable for a wide variety of uses, inasmuch as its speed of rotation, prompt reduction of speed, and direction of rotation may be controlled readily with a simple mechanical arrangement.

In my co-pending application, Serial No. 416,812, I have shown and claimed an induction motor having a stator, which is bodily adjustable about an axis disposed in angular relation to the rotor axis. The claims in the present invention are limited to an induction motor having a segmental stator in which the flux density at any given point constantly shifts at right angles to the conductors thereof, and a mounting for the segments of the stator by which they can be adjusted about an axis disposed radially with respect to the rotor.

It will be understood that minor changes in the size, form and construction of the various parts of my improved induction motor, may be made and substituted for those herein shown and described without departing from the spirit of my invention, the scope of which is set forth in the appended claims.

I claim as my invention:

1. An induction motor, comprising a segmental stator, means by which a magnetic flux is generated which constantly shifts in one direction and so as to traverse only a portion of the rotor, and means for mounting the stator to allow shifting thereof to various positions whereby the angle of intersection of the flux with respect to the rotor bars can be varied.

2. An induction motor, comprising a stator including a plurality of segments, each segment having means by which the magnetic flux is generated which constantly shifts in one direction and so as to traverse only a portion of the rotor, and means for mounting the stator segments to allow of the simultaneous shifting thereof to various positions whereby the angle of intersection of the flux with respect to the rotor bars can be varied.

3. An induction motor having a segmental stator in which the flux density at any given point constantly shifts at right angles to the conductors thereof, and a mounting for the stator by which it can be adjusted about an axis disposed radially with respect to the rotor whereby the angle at which the flux traverses the rotor can be varied.

In testimony whereof I have signed my name to this specification.

RALPH E. STEWART.